June 26, 1956  G. G. GREEN  2,752,113
FLOAT SUPPORT STRUCTURE

Filed Feb. 1, 1954  2 Sheets-Sheet 1

George Garner Green
INVENTOR.

BY James M. Clark

ATTORNEY.

June 26, 1956  G. G. GREEN  2,752,113
FLOAT SUPPORT STRUCTURE
Filed Feb. 1, 1954  2 Sheets-Sheet 2

George Garner Green
INVENTOR.

BY
ATTORNEY.

United States Patent Office 2,752,113
Patented June 26, 1956

2,752,113

FLOAT SUPPORT STRUCTURE

George Garner Green, La Jolla, Calif., assignor, by mesne assignments, to General Dynamics Corporation, a corporation of Delaware Application February 1, 1954, Serial No. 407,205

12 Claims. (Cl. 244—105)

The present invention relates generally to aircraft of the flying boat type and more particularly to an improved arrangement for the support of the floats thereof.

It is well known that seaplanes and flying boats generally require outboard floats or pontoons for purposes of stabilizing the craft while afloat upon the surface of the water. The support of such floats usually presents numerous problems in their design and construction particularly from the standpoint of providing a float support structure of adequate general strength and rigidity while keeping the weight of the structure to a minimum. It is also desirable to reduce to the minimum the resistance of the support structure as well as the interference drag between the support structure and its junction with both the float and the undersurface of the wing. These advantages with respect to strength and rigidity have been obtained by the present improvement to a greater extent than heretofore while sacrificing to a minimum the penalties of additional weight, resistance and interference drag. The present float structure comprises essentially an arrangement of three struts including a centrally positioned strut of constant streamline section disposed in the plane of symmetry of the float and extending upwardly from the top of the float to the undersurface of the wing flanked on each side by identical struts of generally triangular or trapezoidal form located symmetrically with respect to the center-line of the float and the central strut and extending upwardly and angularly from its intersection with the top of the float. Each of the side struts of triangular or trapezoidal plan form has a streamline cross-section tapering from its broad base intersection with the float to a truncated top of appreciably lesser chord at its junction with the undersurface of the wing.

The improved float support structure adequately takes care of the fore and aft bending moments as well as the side loads to which the float may be subjected to thereby obtain relatively great strength and general rigidity. It is evident that, in a float support arrangement involving struts or panels in more than one plane, at least one panel or strut assembly must make an acute angle with the lower surface of the wing, as viewed in the direction of the airflow. Prior float supports have usually had two or more such acute angle strut intersections with the lower wing surface with strut sections of appreciable chord resulting in support structures of great weight, and aerodynamic drag and resistance. The present arrangement is directed to minimizing the interference drag between the strut and the wing by locating the narrow ends of the triangular panels (the ends having the lesser chord) at the wing undersurface and positioning the broad ends of the panels (those having the greater chord dimensions) to join the float in such a manner as to be approximately normal to the curved deck of the float, thus avoiding the bad interference characteristics of acute angle junctures. The central strut is of relatively short chord dimension and is located in the plane of symmetry of the float with a juncture at both the wing surface and the float deck.

It is, accordingly, a major object of the present invention to provide an improved float support structure of relatively great strength and rigidity while being appreciably light in weight and having minimum interference drag between the struts and the wing. It is a further object to provide an improved triangulated dual support structure for a wing float comprising a central strut and side struts of tapered streamline cross-section angularly disposed to the central strut. It is a further object to provide an improved arrangement for the support of a float from an aircraft wing having a relatively high strength-to-weight ratio and presenting a minimum of interference drag and overall resistance. A still further objective resides in an improved relationship of the several components of a float support structure both in the shape and position of each of the components as well as their points of attachment to the wing and to the float.

Other objects and advantages of the present invention will occur to those skilled in the art after reading the following description taken in conjunction with the accompanying drawings, forming a part hereof, in which.

Figure 1:
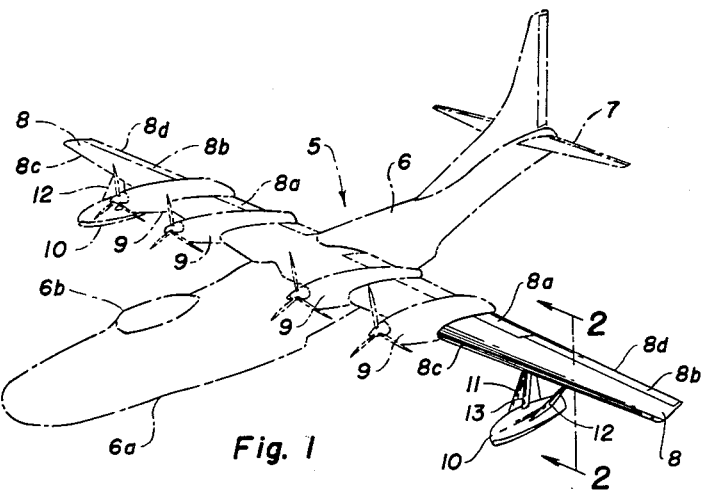
Fig. 1 is a perspective view of a flying boat to which a preferred form of the improved float support structure has been applied.

The flying boat 5 of Fig. 1 is comprised of a fuselage 6 having a boat hull portion 6a and a control compartment or cockpit 6b. The flying boat 5 also includes a conventional empennage or tail assembly 7 and a laterally extending high wing 8 which may preferably include landing flaps 8a and lateral control ailerons 8b disposed at the trailing edge 8d, with the leading edge of the wing 8 being indicated at 8c and with the manufacturing chord plane indicated at 8e. The craft may preferably be provided with a plurality of suitable power plant units 9 carried by the inboard portions of the wing 8 with the outboard floats 10 supported from the outer portions of the wing 8 by means of the improved float support structure comprising the struts 11, 12 and 13.

Figure 4:
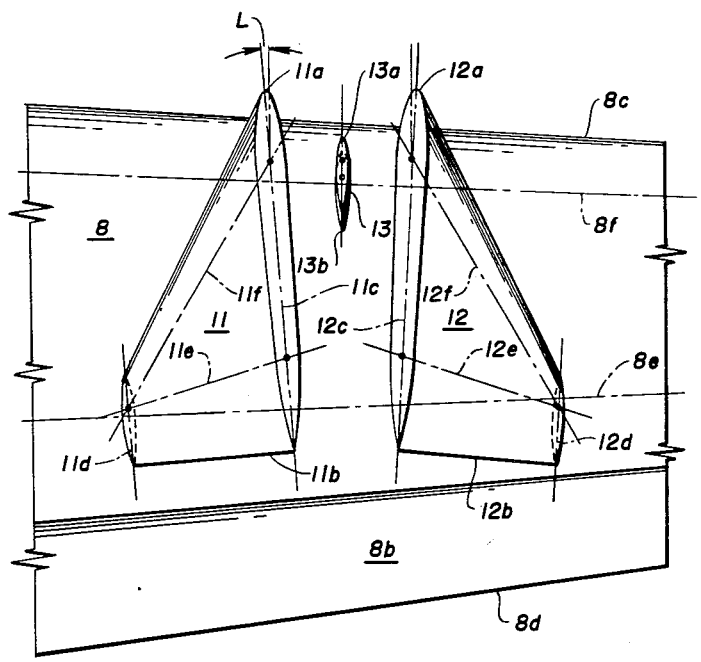
Fig. 4 is a bottom plan view looking upwardly as taken along the lines 4—4 of Fig. 3.
Figure 2:
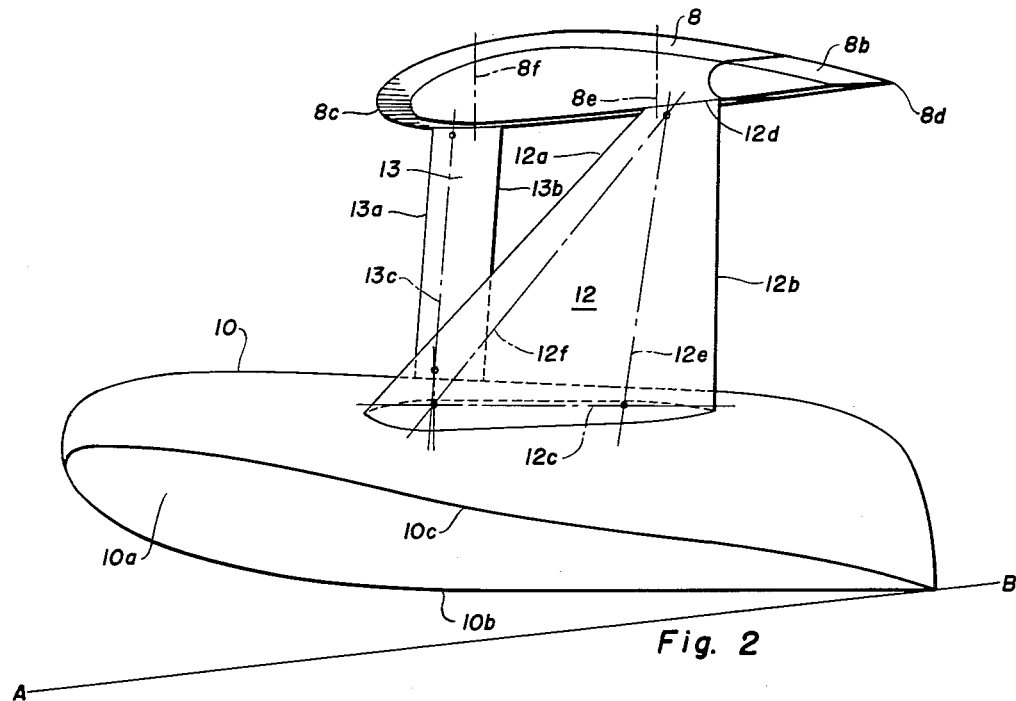
Fig. 2 is a side elevational view of the float structure shown in Fig. 1 as taken along the lines 2—2 thereof.
Figure 3:
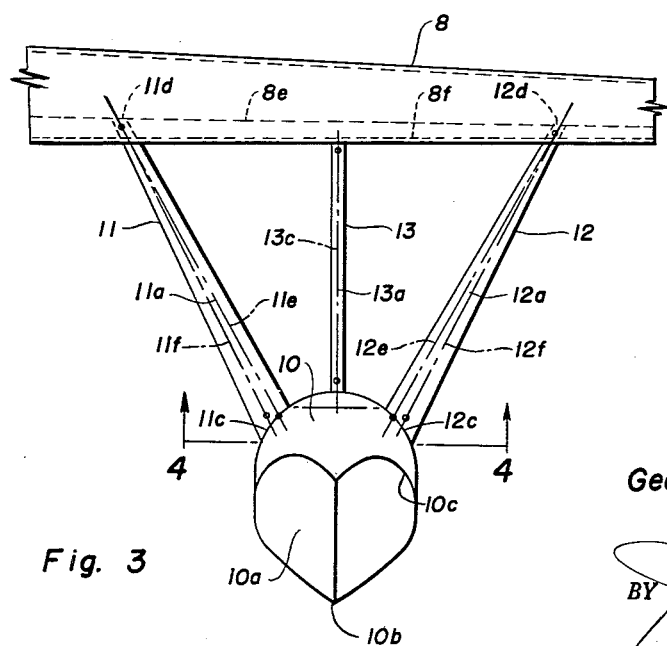
Fig. 3 is a front elevational view of the same.

Referring now to Figs. 2, 3 and 4, wherein is depicted an embodiment illustrative of the present invention, it will be noted that the support assembly is comprised of the two symmetrically disposed substantially triangular or trapezoidal side struts 11 and 12 and the intermediate generally vertically disposed strut 13. The inboard side strut 11 is comprised of a streamline cross-section having a leading edge 11a and a trailing edge 11b extending from its base or point of attachment at 11c at the upper deck of the float 10, upwardly and in the inboard direction to its attachment to the wing. The front and rear spars 11f and 11e of the strut 11 preferably form a triangle as indicated by the construction lines having its base forming the attachment 11c at the float deck with the spars intersecting at their upper inboard ends for attachment to the aft portion of the wing 8 along the attachment line 11d. The leading edge 11a of the strut 11 at its junction with the deck of the float is substantially below the leading edge of the wing 8 but is highly swept-back as the streamline strut 11 tapers upwardly and inboard such that the chord dimension of the strut at the section 11d is of the order of approximately a fourth or fifth of the chord of the section at its base 11c, whereas the trailing edge 11b although sloping upwardly and inwardly lies in a substantially transverse vertical plane. As more particularly shown in Fig. 4, the strut 11 is preferably toed-out from the fore and aft direction parallel to the longitudinal axis of the hull 6, such that approximately a 4° toe-out angle L is provided in the chord plane.

The other strut 12 having leading and trailing edges 12a and 12b is preferably identical to the strut 11 except that it is symmetrically disposed and accordingly opposite hand in shape and construction, being also disposed at a toe-out angle of the order of about 4° such that the chord lines converge rearwardly meeting in an angle of approximately 8°. The side struts 11 and 12 are preferably of streamline cross-sections and struts which have proven particularly satisfactory in actual use were based upon an N. A. C. A. 653-018 airfoil section forward of the front spars 11f and 12f with the strut disposed at approximately 40% chord of that N. A. C. A. section. The strut front spars 11f and 12f may preferably taper in a straight line from approximately 3½" deep at the upper fitting points 11d and 12d to approximately an 8" depth at the lower fitting points 11c and 12c. The struts are preferably formed with straight sides between the front and rear spars 11f and 11e, and 12f and 12e, respectively, with the straight sides tangent to the airfoil at the front and rear spars. Aft of the rear spars 11e and 12e the strut may be of parabolic shape tangent to the straight sides at the rear spar and forming approximately a 20° trailing edge angle. The strut rear spars 11e and 12e may preferably taper in a straight line from a 3½" depth at the upper fitting lines 11d and 12d to approximately a 7" depth at the lower fitting lines 11c and 12c.

The central strut 13, in the embodiment illustrated, is substantially vertically disposed having its main spar 13c connected to the wing in the region of or slightly forward of the front spar 8f of the wing and is connected at its lower terminal to the deck of the float 10 substantially between the connections of the front spars 11f and 12f of the side struts. The central strut 13 is of constant airfoil cross-section and the N. A. C. A. 0018 airfoil section has been satisfactorily used in actual practice. As more particularly shown in Fig. 4, the central strut 13 is parallel with the fore and aft axis of the aircraft and is centrally disposed between the adjacent rearwardly converging side struts 11 and 12. It preferably has but a single spar 13c of uniform thickness or depth and has leading and trailing edges 13a and 13b, respectively.

Though central strut 13 has been illustrated in Figure 2 of the drawings as being essentially normal, or vertically disposed relative to the float it is to be understood that it is not limited thereto since the present invention contemplates embodiments wherein central strut 13 may be slanted so as to be angularly disposed to the float; however, the central strut 13 is required to be located in the plane of symmetry of the float (as best shown in Figure 3) irrespective of its angular disposition relative to the float in such plane.

Angular side struts 11 and 12 and central strut 13 are suitably affixed at their ends to the wing and float through the use of any usual connectors to restrict any tendency toward disturbance of the geometry of the present support structure when subjected to loads applied against the float in the operation of the aircraft.

The float 10 may be of conventional shape and construction being provided with hydroplaning surfaces 10a intersecting at the keel 10b and meeting the rounded upper deck at the side chines 10c. The relationship of the float 10 to the wing 8 and the intervening support structure assembly comprising struts 11, 12 and 13 shown in Fig. 2, with the static load water line under normal gross weight loading of the craft indicated by the line A—B. Accordingly, at normal take-off and flight attitudes the airfoil strut panels 11 and 12 will be addressed to the airstream at positive angles of attack, forming in effect a pair of lift airfoils or wings of relatively high dihedral with respect to each other and the float 10, these airfoils having relatively great thickness taper and sweepback of the leading edges 11e and 12e.

The disclosed float support structure has provided very satisfactory aerodynamic advantages by materially minimizing the interference drag between the struts and the wing. While, as indicated above, it is inherent in float support design involving struts or panels disposed in more than one plane that at least one panel or strut assembly must make an acute angle with the lower surface of the wing, the presently disclosed arrangement greatly minimizes the interference drag by locating the narrow ends of the trapezoidal or triangular panels at the wing undersurface. The broad ends of the bases of the strut panels join the float in such a manner as to be approximately normal to the curved deck of the float thereby avoiding the bad interference characteristics of acute angle junctures as viewed in the direction of the airstream. In the present arrangement, the central strut 13 is both relatively small in size and weight, is joined with both the wing surface and the float deck in the plane of symmetry of the float, and is disposed in a position in which it supplements the side struts in providing a particularly rigid and high strength-to-weight ratio structure between the float and the wing.

Other forms and arrangements of the present invention, both with respect to its general arrangement and the details of its several components, which may occur to those skilled in the art after reading the foregoing description are intended to come within the scope and spirit of this invention, as more particularly set forth in the appended claims.

I claim:

1. In a float sole support structure for the support of a stabilizer float from a cantilever wing, a central strut disposed in the plane of symmetry of said float, said central strut being of constant airfoil cross-section and connected to said wing and to said float, and a pair of side struts of trapezoidal plan form having base portions of greater chordwise dimension attached to said float and their upper portions of lesser chordwise dimension attached to said wing, the length of each said side strut being substantially the same as the said chordwise dimension of said base portion.

2. In a float entire support structure for the support of a stabilizing float from a cantilever wing, a central vertical strut of constant airfoil cross-section connected adjacent the leading edge of said wing and to the deck of said float, and a pair of side struts of trapezoidal plan form having base portions attached to said float and their upper portions of lesser chordwise dimension attached to said wing, the said side struts having relatively great dihedral with respect to said float and being symmetrically disposed about the plane of symmetry of said float with a toe-out relationship.

3. In a flying boat having a cantilever wing and a stabilizing float, said wing having front and rear spars, a support structure for the support of said float from said wing comprising a central vertically disposed strut connected to said wing and to said float, and a pair of laterally disposed outwardly and upwardly extending struts of triangular plan form, said side struts attached adjacent their converging base ends to said float and attached at their diverging apex ends to the rear spar of said wing, the said laterally disposed struts having relatively great dihedral and sweep-back and being disposed with an angle of toe-out with respect to each other.

4. In a flying boat having a stabilizing float and a cantilever wing, means for supporting said float entirely from the outer portion of said wing comprising a central strut attached to said wing adjacent the leading edge thereof and to said float, said central strut disposed within the plane of symmetry of said float, and angularly disposed side strut means each of generally triangular plan form attached to an upper portion of said float and to said wing at a point aft of the point of attachment of said central strut to said wing, the said side strut means being symmetrically disposed about said central strut and said plane of symmetry.

5. In a support structure for the sole support of a stabilizing float from a cantilever wing, a central vertically disposed strut of constant airfoil cross-section connected to said wing and to said float, and a pair of side struts of trapezoidal plan form having base portions attached to said float and having their opposite upper portions attached to said wing, the said side struts being symmetrically disposed about said central strut.

6. In an aircraft having a cantilever wing and stabilizing float, a support structure for the sole support of said float from said wing comprising a central vertically disposed strut of constant airfoil cross-section connected to said wing and to said float and a pair of laterally disposed outwardly and upwardly extending struts of tapered airfoil cross-section symmetrically attached on opposite sides of said vertically disposed strut adjacent their converging ends to said float and attached at their diverging ends to said wing, the chordwise dimension of the converging end portions of each of said pair of laterally disposed struts being of the order of four times the chordwise dimension of the diverging end portions.

7. In a flying boat having a cantilever wing and a stabilizing float, a support structure for the support of said float from said wing comprising a central vertically disposed strut connected to said wing and to said float and a pair of laterally disposed outwardly and upwardly extending struts of triangular plan form, said side struts attached adjacent their converging base ends to said float and attached at their diverging apex ends to said wing, the chordwise dimension of each of said strut portions connected to said wing being substantially equal and not greater than one-third of the corresponding dimension of the portions of said laterally disposed struts attached to said float.

8. In a float support structure for the entire support of a stabilizing float from a cantilever wing, said wing having front and rear spars, a central strut disposed in the plane of symmetry of said float, said central strut being of constant airfoil cross-section and connected to the front spar of said wing and to said float, and a pair of side struts of trapezoidal plan form having base portions of greater chordwise dimension attached to said float and having their upper portions of lesser chordwise dimension attached to the rear spar of said wing, the length of each said side strut being substantially the same as the said chordwise dimension of said base portion attached to said float.

9. In a flying boat having a cantilever wing and a stabilizing float, said wing having front and rear spars, a support structure for the support of said float from said wing comprising a central vertically disposed strut connected to the front spar of said wing and to said float, and a pair of laterally disposed outwardly and upwardly extending struts of triangular plan form symmetrically disposed about said central strut, said side struts attached adjacent their convergin base ends to said float and attached at their diverging apex ends to the rear spar of said wing, the said laterally disposed struts having relatively great dihedral such that their intersections with the upper portion of said float are made relatively normal thereto and their intersections with the lower surface of said wing are made at relatively great angle having a minimum interference drag between said strut ends and the undersurface of said wing.

10. In an aircraft of the flying boat type having a cantilever wing and a stabilizing float, said wing having at least two chordwise spaced spars, a structure for the sole support of said float from said wing spars comprising a centrally disposed strut attached to the wing in the region of a first of said spars and to said float, said central strut disposed within the plane of symmetry of said float, and a pair of laterally disposed outwardly extending struts of trapezoidal plan form symmetrically attached on opposite sides of said centrally disposed struts adjacent their converging ends of greater chord dimension to said float and attached to the wings at their diverging ends of lesser chord dimension in the region of the second of said spars of said wing.

11. In an aircraft having a cantilever wing and a stabilizing float, said float having a rounded upper portion, said wing having at least two chordwise spaced spars, a structure for the sole support of said float from the spars of said wing comprising a centrally disposed strut connected to one of the said spars of said wing and to said float, said central strut disposed in the plane of symmetry of said float, and a pair of laterally disposed outwardly and upwardly extending side struts of triangular plan form symmetrically disposed about said central strut, said side struts attached at their converging base ends of greater chord dimension to said float and attached to their diverging ends of lesser chord dimension to the other of said spars of said wing, the said laterally disposed side struts having relatively great dihedral such that their intersections with the rounded upper portion of said float are made relatively normal thereto and their intersections with the lower surface of said wing are made at relatively great angles having a minimum interference drag between said strut ends and the undersurface of said wing.

12. In a support structure for the sole support of a stabilizing float from a cantilever wing, said float having a rounded upper portion, a centrally disposed strut of constant airfoil cross-section connected to said wing and to said float, and a pair of side struts of trapezoidal plan form having base portions of greater chord attached to said rounded upper portion of said float and having their upper portions of lesser chord attached to said wing, the said side struts being symmetrically disposed about said central strut and having relatively greater dihedral such that their intersections with the rounded upper portion of said float are made relatively normal thereto and their intersections with the lower surface of said wing are made at relatively great angles having minimum interference drag between said strut ends and the undersurface of said wing.

References Cited in the file of this patent

UNITED STATES PATENTS

| Number | Name | Date |
|---|---|---|
| D. 126,523 | Eaton | Apr. 8, 1941 |
| 1,346,570 | Van Keuren | July 13, 1920 |
| 1,587,615 | Strauss | June 8, 1926 |
| 1,790,894 | Bellanca | Feb. 3, 1931 |
| 1,835,369 | Bellanca | Dec. 8, 1931 |
| 1,887,627 | Finger | Nov. 15, 1932 |
| 1,888,902 | Bellanca | Nov. 22, 1932 |